UNITED STATES PATENT OFFICE.

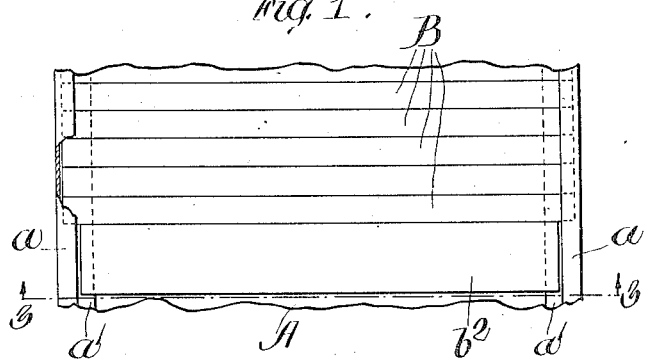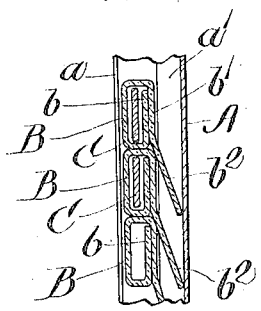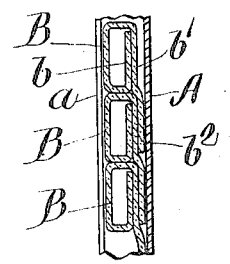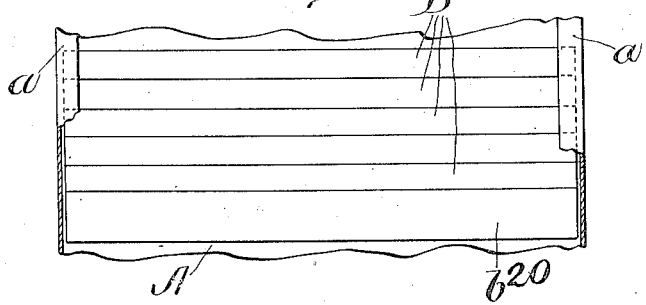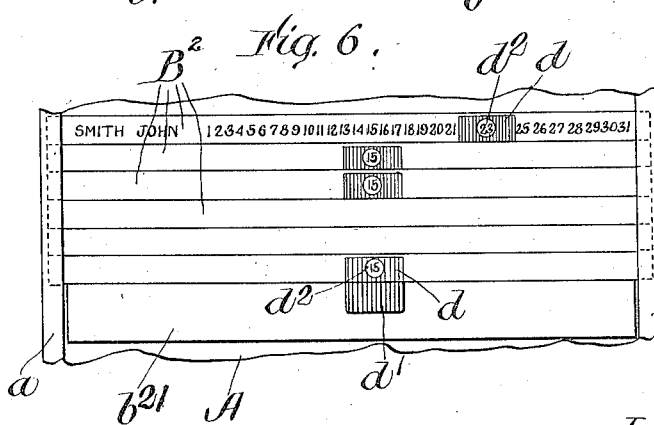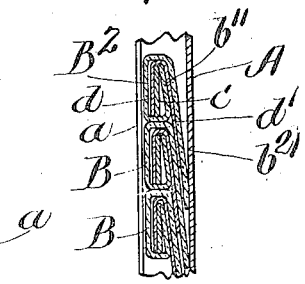

JAMES H. RAND, OF NORTH TONAWANDA, NEW YORK.

CARD-INDEX.

1,227,661.　　　　　Specification of Letters Patent.　　Patented May 29, 1917.

Application filed June 21, 1916. Serial No. 104,916.

*To all whom it may concern:*

Be it known that I, JAMES H. RAND, a citizen of the United States, and resident of North Tonawanda, in the county of Niagara and State of New York, have invented new and useful Improvements in Card-Indexes, of which the following is a specification.

This invention relates to indexes of the so-called visible index type, and consists in the novel and improved features of construction hereinafter described and particularly pointed out in the claims.

In the accompanying drawings which illustrate certain embodiments of the invention,—

Figure 1 is a face view of part of an index containing the invention;

Fig. 2 is a longitudinal section of said index on an enlarged scale;

Fig. 3 is a cross section on line 3—3 of Fig. 1;

Fig. 4 is a face view of a part of an index showing a modification of the invention;

Fig. 5 is a longitudinal section on an enlarged scale illustrating the index shown in Fig. 4;

Fig. 6 is a face view of the index with adjustable indicators applied thereto; and Fig. 7 is a longitudinal section of the parts shown in Fig. 6, on an enlarged scale, through some of the indicators.

The index comprises a frame A having inwardly bent flanges $a$, one at each side, and a pair of spaced guide rails $a'$, $a'$, between and parallel to the flanges $a$ and preferably located underneath the said flanges, forming therewith a pair of inwardly facing guide channels. A series of index slip holders B are mounted in the frame with their ends in said guide channels and slidable lengthwise thereof. Each slip holder B is made of transparent resilient material such as sheet celluloid and comprises a closed relatively long and narrow front face and a pair of rearwardly and inwardly bent lips $b$, $b'$, one overlapping the other, adapted to hold an index slip and forming therefor a transparent sheath.

The rear overlapping lip $b'$ is made materially broader than the face of the sheath, thereby forming a flap $b^2$ which extends from the rear of the sheath substantially flatwise of the frame and underneath the next adjoining sheath or sheaths. Said flap $b^2$ preferably terminates short of the ends of the index slip holder B, and is preferably bent rearwardly a little as best shown in Fig. 2, and extends between the guide rails $a'$ of the frame with only sufficient clearance to slide freely lengthwise of said guide rails. Said flaps $b^2$ with their edges engaged and guided by the rails $a'$, and lying underneath the adjoining sheath or sheaths, perform two main functions, namely, they serve to prevent the sheaths D from bending or bulging outward from the frame, which is particularly desirable in the case of wide frames carrying long sheaths, since each sheath is held flat in the frame not only by its own stiffness but is supported by the adjacent overlying sheath or sheaths; and in the form shown in Figs. 1, 2 and 3 in which the flaps $b^2$ extend between the guide rails $a'$ they serve to prevent the sheaths from twisting in the frame or moving out of the line substantially perpendicular to the guide channels.

In the form shown in Figs. 4 and 5 the frame and sheaths B' are substantially the same as the form shown in Figs. 1, 2 and 3, save that the guide rails $a'$ are omitted and the flaps $b^{20}$ of the sheaths are made the full length of the sheaths, extending as before behind the adjacent sheath or sheaths. By this construction the advantage is secured by giving to each sheath the support of the adjacent sheath or sheaths to prevent the bending or bulging forward of the sheaths, and the advantage is also secured in a measure of preventing the sheaths from twisting in the frame, since the edges of the flaps engage the channels under the flanges $a$, thus affording a longer bearing surface than the ends of the sheaths proper. In this case the flaps $b^{20}$, which do not project between the guide rails, may be made more nearly parallel to the plane of the frame than in the forms shown in Figs. 1, 2 and 3.

In the construction shown in Figs. 6 and 7, the frame and sheaths $B^2$ are substantially similar to those already described, save that the flaps $b^2$ do not extend to the ends of the sheaths B and into the guide channels of the frame, and are not guided by guide rails. This construction secures the advantage of the mutual support given to the several sheaths by the flaps extending flatwise underneath the adjoining sheath or sheaths, but does not secure the advantage of guiding the sheaths and holding them against twisting when they are shifted lengthwise of the frame.

An adjustable signal or indicator member of suitable sheet material is shown in Figs. 6 and 7, having a signal portion $d$ located between the front face of the index holder and the index slip C, thence bent over one edge of the index slip C and projecting flatwise of the index holder through the space between the retaining lips $b^{11}$, $b^{21}$, forming a tab portion by which the indicator member may be moved lengthwise of the slip holder. The signal portion of the indicator member may be provided with a sight aperture $d^2$ through which a numeral or other character on the index slip C may be exposed and conspicuously brought to the attention of the user.

In any of the forms of slip holders the index slip C is inserted through the end of the sheath, and is removably held therein; and obviously the adjustable signal or indicator could be applied as described to any of the forms of index slip holders.

I claim:—

1. An index comprising a frame having inwardly facing guide channels, and a series of index slip holders having their ends in said guide channels and slidable lengthwise thereof, said holders being made of transparent resilient sheet material, each comprising a closed front face, a pair of rearwardly bent lips adapted to hold an index slip, and a flap extending from the rear of the sheath flatwise of the frame underneath the adjoining sheath or sheaths.

2. An index comprising a frame having inwardly facing guide channels, a pair of spaced guide rails between and parallel to said channels, and a series of index slip holders having their ends in said guide channels and slidable lengthwise thereof, said holders being made of transparent resilient sheet material, each comprising a closed front face, a pair of rearwardly bent lips adapted to hold an index slip, and a flap extending from the rear of the sheath flatwise of the frame between said guide rails and underneath the adjoining sheath or sheaths.

3. An index comprising a frame having inwardly facing guide channels, and a series of index slip holders having their ends in said guide channels and slidable lengthwise thereof, said holders being made of transparent resilient sheet material, each comprising a closed front face, and a pair of rearwardly and inwardly bent lips adapted to hold an index slip, one lip overlapping the other and being materially broader than the face of the sheath thereby forming a flap extending from the rear of the sheath flatwise of the frame underneath the adjoining sheath or sheaths.

4. An index comprising a frame having inwardly facing guide channels, and a series of index slip holders having their ends in said guide channels and slidable lengthwise thereof, said holders being made of transparent resilient sheet material, each comprising a closed front face, and a pair of rearwardly and inwardly bent lips adapted to hold an index slip, one lip overlapping the other and being materially broader than the face of the sheath thereby forming a flap extending from the rear of the sheath flatwise of the frame underneath the adjoining sheath or sheaths, said flap terminating short of the ends of the index slip holder.

5. An index comprising a frame having inwardly facing guide channels, a pair of spaced guide rails between and parallel to said channels, and a series of index slip holders having their ends in said guide channels and slidable lengthwise thereof, said holders being made of transparent resilient sheet material, each comprising a closed front face and a pair of rearwardly and inwardly bent lips adapted to hold an index slip, one lip overlapping the other and being materially broader than the face of the sheath, forming a flap extending from the rear of the sheath flatwise of the frame underneath the adjoining sheath or sheaths, said flaps being of a length corresponding to the distance between said guide rails and being rearwardly bent to extend therebetween.

6. An index slip holder made of transparent resilient sheet material comprising a closed front face and a pair of rearwardly bent lips adapted to hold an index slip, one lip overlapping the other and lying approximately parallel to the front face and being materially broader than the front face thereby forming a flap extending from the rear of the sheath.

7. An index slip holder made of transparent resilient sheet material comprising a closed front face and a pair of rearwardly bent lips adapted to hold an index slip, one lip overlapping the other and lying approximately parallel to the front face and being materially broader than the front face thereby forming a flap extending from the rear of the sheath, said flap terminating short of the ends of the index slip holder.

8. An index slip holder made of transparent resilient sheet material comprising a closed front face and a pair of rearwardly bent retaining lips, an index slip held by said lips, and an adjustable signal or indicator member having a signal portion located between the front face of the holder and the index slip, and a tab portion bent over one edge of the index slip and projecting outside of the holder through the space between said retaining lips, by which said indicator member may be moved lengthwise of the slip holder.

9. An index slip holder made of transparent resilient sheet material comprising a closed front face and a pair of rearwardly bent retaining lips, an index slip held by said lips, and an adjustable signal or indicator member of sheet material having a signal portion located between the front face of the holder and the index slip and made with a sight aperture, and a tab portion bent over one edge of the index slip and projecting flatwise of the holder through the space between said retaining lips, by which said indicator member may be moved lengthwise of the slip holder.

Signed by me at North Tonawanda, this 16th day of June 1916.

JAMES H. RAND.